(12) United States Patent
Gordon et al.

(10) Patent No.: US 6,455,804 B1
(45) Date of Patent: Sep. 24, 2002

(54) CONTINUOUS METAL MATRIX COMPOSITE CONSOLIDATION

(75) Inventors: Brian Louis Gordon, Wheeling, WV (US); Brian E. Joseph, Wheeling, WV (US); James Frederick Witzqall, Wheeling, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 33 days.

(21) Appl. No.: 09/733,566

(22) Filed: Dec. 8, 2000

(51) Int. Cl.[7] .......................... B23K 26/00; B23K 1/002
(52) U.S. Cl. ................. 219/121.64; 219/85.13
(58) Field of Search ................. 219/121.63, 121.64, 219/121.85, 85.12, 85.13, 76.1–76.17; 228/145

(56) References Cited

U.S. PATENT DOCUMENTS

| | | | | |
|---|---|---|---|---|
| 1,854,536 A | * | 4/1932 | Wilson | 219/123 |
| 1,928,639 A | * | 10/1933 | Berg | 136/201 |
| 2,067,801 A | * | 1/1937 | Taylor | 138/154 |
| 3,773,241 A | * | 11/1973 | Norris | 228/5.1 |
| 3,909,898 A | * | 10/1975 | Hicks | 156/269 |
| 4,353,162 A | * | 10/1982 | Van Meteren | 226/112 |
| 4,803,334 A | * | 2/1989 | Burke et al. | 219/121.63 |
| 4,841,617 A | * | 6/1989 | Schmidt et al. | 219/121.64 |
| 4,969,255 A | * | 11/1990 | Schmidt et al. | 219/121.64 |
| 5,310,443 A | * | 5/1994 | Burger | 156/466 |
| 5,320,882 A | * | 6/1994 | Chen | 219/121.85 |
| 5,343,015 A | * | 8/1994 | Ryan | 219/121.64 |
| 5,410,133 A | * | 4/1995 | Matsen et al. | 219/615 |
| 5,578,227 A | * | 11/1996 | Rabinovich | 156/180 |
| 5,645,747 A | * | 7/1997 | Matsen et al. | 219/645 |
| 5,809,647 A | * | 9/1998 | Wagner et al. | 29/890.048 |
| 6,053,209 A | * | 4/2000 | Wagner et al. | 138/142 |
| 6,144,008 A | * | 11/2000 | Rabinovich | 156/180 |

FOREIGN PATENT DOCUMENTS

FR         2 805 198 A1 *  8/2001

* cited by examiner

Primary Examiner—Tom Dunn
Assistant Examiner—Zidia Pittman

(57) ABSTRACT

A method for the fabrication of large metal matrix composite structures comprising the continuous brazing of aluminum matrix braze-clad tape using an infrared laser to melt the braze clad on the tape while applying pressure to the tape and simultaneously contacting it with previously applied tape layers on a rotating mandrel. The apparatus utilized to accomplish this fabrication process may include a variety of pre and post-contact heaters and preferably includes instruments for the continuous monitoring and control of the process.

23 Claims, 2 Drawing Sheets

CONTINUOUS METAL MATRIX COMPOSITE CONSOLIDATION

FIELD OF THE INVENTION

The present invention relates to methods and apparatus for the continuous consolidation of metal matrix composite materials and more particularly to methods and apparatus for the consolidation of aluminum matrix, ceramic fiber reinforced metal matrix composites in prepeg tape form.

BACKGROUND OF THE INVENTION

The advantageous properties of metal matrix composites, especially aluminum matrix composites that incorporate ceramic reinforcing fibers are well known and recognized in the art and include high specific strength, high specific stiffness, maintenance of properties at extremes of high and low temperature and their resistance or lack of outgassing in a vacuum which is a major shortcoming of many competitive materials. These properties are of particular importance in aviation and space vehicle and structural applications. In fact, it has been estimated that the use of aluminum matrix composites of this type in, for example, launch vehicles could reduce their weight by as much as 30%, thus increasing their available payload by alike amount.

What is inhibiting the use of such materials in launch and similar vehicles, is a cost effective manufacturing method for the production of large structures from these materials. The provision of such a method would permit such applications for these materials and provide all of the accompanying attendant benefits to such use.

OBJECTS OF THE INVENTION

It is therefore an object of the present invention to provide a method for the manufacturing of large structural members from aluminum metal matrix composites (AMCs).

It is another object of the present invention to provide cost effective such a manufacturing method.

It is yet another object of the present invention to provide apparatus for the implementation of such a manufacturing method.

SUMMARY OF THE INVENTION

According to the present invention, there is provided a method for the fabrication of large AMC structures comprising the continuous brazing of aluminum matrix braze-clad tape using an infrared laser to melt the braze clad on the tape while applying pressure to the tape and simultaneously contacting it with previously applied tape layers on a rotating mandrel. The apparatus utilized to accomplish this fabrication process may include a variety of pre and post-contact heaters and preferably includes instruments for the continuous monitoring and control of the process.

DETAILED DESCRIPTION

The present invention provides a method for the cost effective fabrication/manufacture of large structural members of aluminum metal matrix composites. The feedstock for the process is a metal matrix composite (MMC), specifically an aluminum matrix composite (AMC), in prepeg tape form comprised of alumina ($Al_2O_3$) fibers in an aluminum/aluminum alloy matrix. The prepeg tape is coated with a "brazing" alloy, i.e. an aluminum alloy having a lower melting point than the aluminum matrix of the prepeg tape, prior to application in the process of the present invention. Fabrication is accomplished by applying the braze material coated prepeg tape to a rotating mandrel with the application of pressure while simultaneously melting the braze coating at the junction between the prepeg tape and the mandrel surface using a laser, preferably an infrared or diode laser that provides very limited and very localized heating and melting of the braze coat. The laser beam of infrared radiation preferably has a rectangular cross section to enhance heating efficiency in the area of the junction. As will be seen from the detailed description that follows, a variety of pre and post-contact heaters and process control devices are preferably used to control and monitor the process. The braze-coated feedstock just described can be prefabricated at a remote location and provided in coil form, or, as described hereinafter, can be prepared just prior to fabrication by coating the AMC prepeg with the braze coat in line just prior to exposure to the laser radiation and application to the mandrel.

While any number of techniques such as spraying (thermal, arc, plasma, etc.), surface alloying, etc. can be used to apply the lower melting braze coating to the prepeg tape, in the case where the braze coating is applied in line with the consolidation operation, the prepeg tape is guided through a pot of molten brazing, i.e. lower melting, metal, extracted from the pot of metal through a coating thickness control device such as a die or air knife, and then through a cooling chamber to solidify the coating. Preferably, the pot of molten metal is equipped with an ultrasonic pulse inducing element comprising a power supply, a transducer and a probe to facilitate coating of the matrix of the prepeg tape with the braze coating. When used, the ultrasonic probe is inserted into the pot of lower melting molten metal it produces a cavitation field that results in pressure waves that reduce the contact angle and improve the wetting of the lower melting material to the prepeg. The cooling chamber can be highly sophisticated, but can be as simple a metal tube through which is flowed a chilled gas such as nitrogen and through which the braze coated prepeg travels on exit from the coating pot and the thickness control device.

Figure 1:
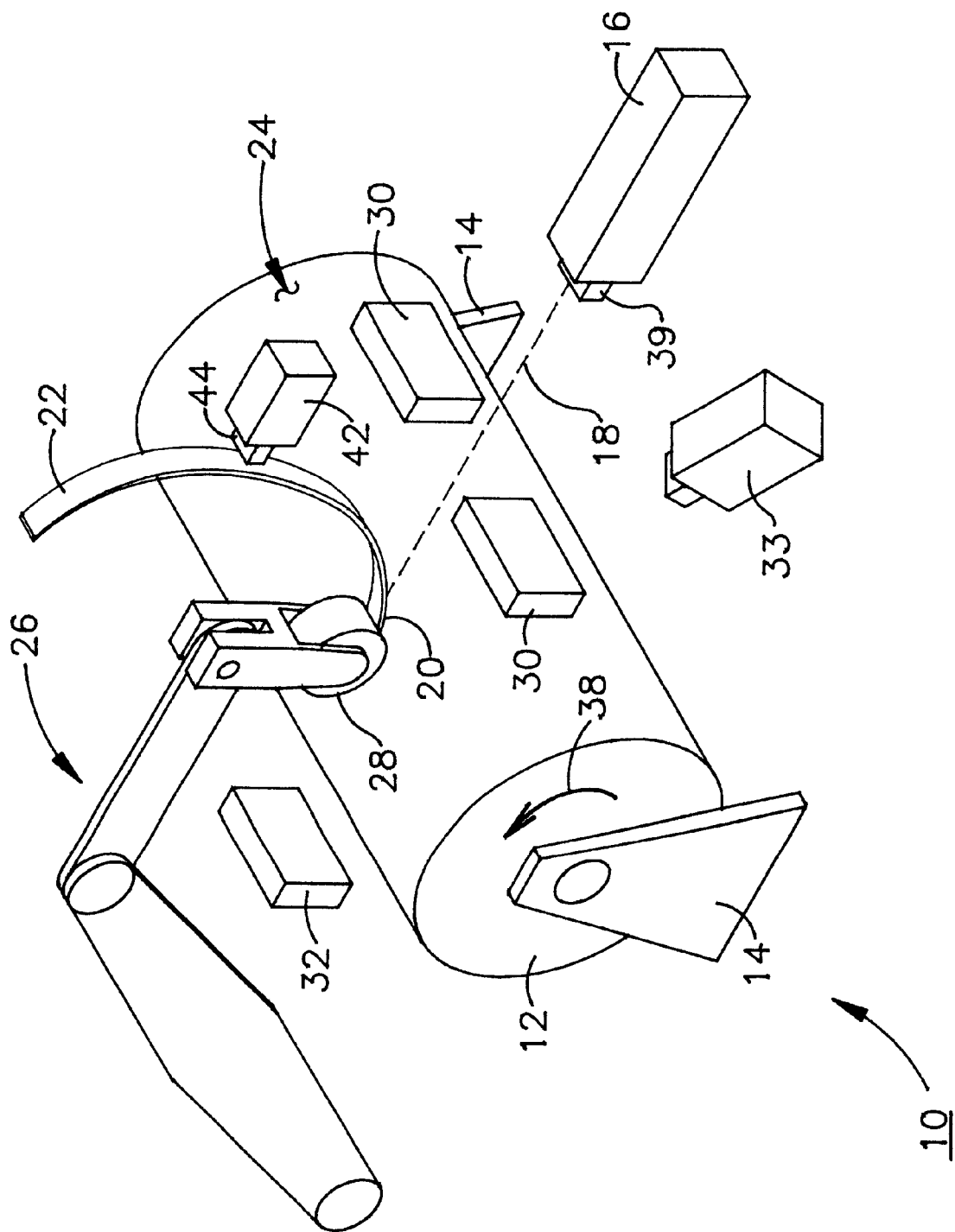
FIG. 1 is a schematic perspective view of apparatus suitable for the manufacture of AMC structures in accordance with the process of the present invention.

Referring now to FIG. 1, the consolidation apparatus 10 of the present invention, comprises a rotating mandrel 12 supported on legs 14 (or any other suitable support system), a laser 16 that directs a beam of infrared radiation 18 to the junction 20 between braze coated prepeg tape 22 and surface 24, a carriage unit 26 that supports and imparts lateral traversing motion to compaction wheel 28, pre-heaters 30 and post heater(s) 32. According to a preferred embodiment of the present invention, an optical pyrometer 33 can be used to monitor the temperature at junction 20 and the signal therefrom used to control either the mandrel rotation an/or carriage unit traverse speeds or the intensity of laser 16, to thereby control the temperature of the molten braze coating 36 (see FIG. 2) that occurs at junction 20.

Figure 2:
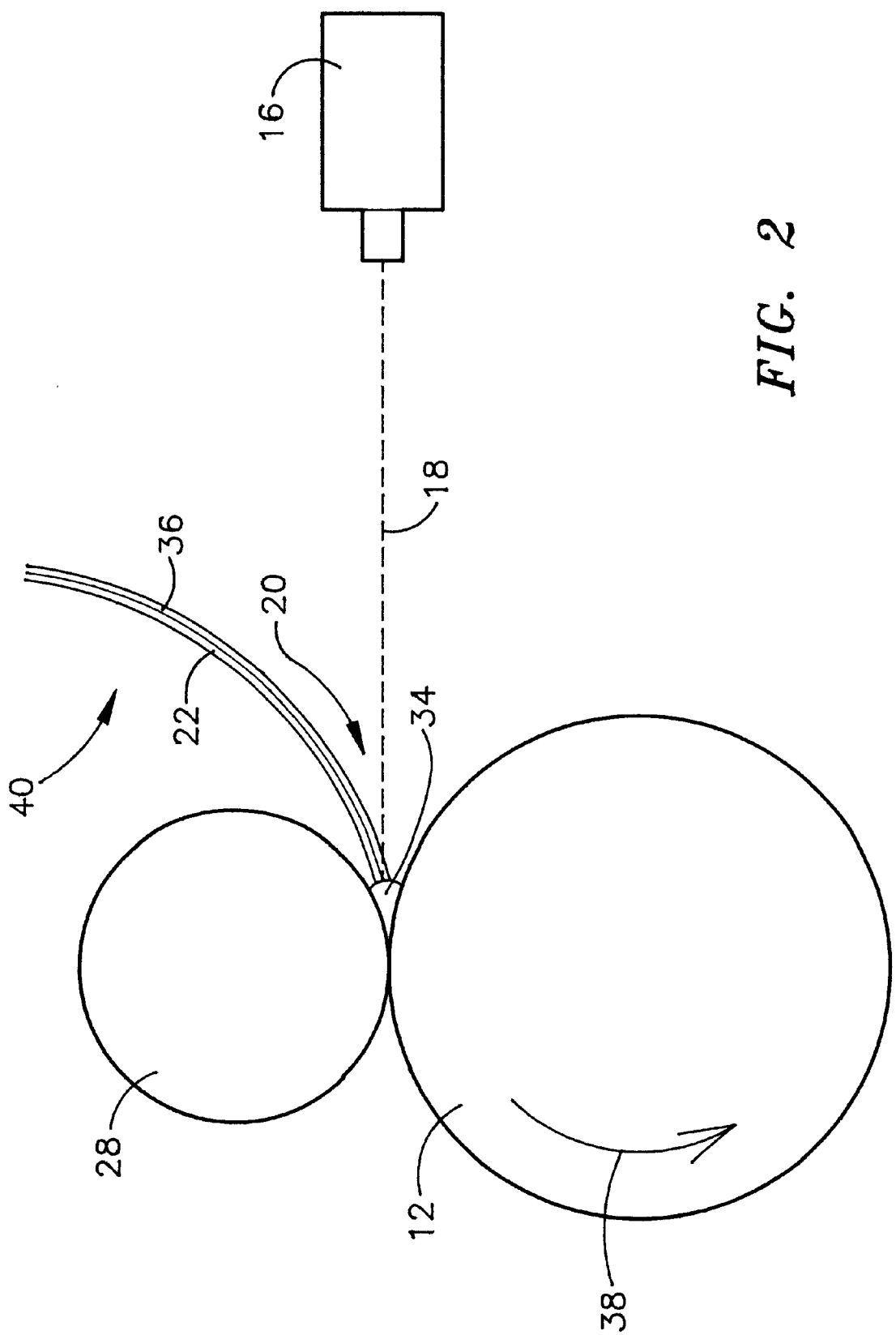
FIG. 2 is a schematic depiction of the area of contact between the mandrel surface, and the incoming prepeg tape at the point of application of infrared laser radiatiion in accordance with the process of the present invention.

Referring now to FIG. 2 that schematically depicts a side view of consolidation apparatus 10 and shows the relative positions of laser 16, infrared radiation beam 18, compaction wheel 28, mandrel 12 and incoming braze-coated prepeg tape 22 at junction 20, it is readily observed that at junction 20, there exists a "front" of molten metal 34 that comprises the molten or liquid form of braze coating 36 on prepeg tape 22. Front 34 is produced by the localized heating induced by the impact of infrared raditation beam 18 upon the surface of braze coating 36. It must be noted, that although not specifically depicted in FIG. 2, surface 24 of mandrel 12 includes at least one wrap of previously applied prepeg tape 22 to which incoming feedstock prepeg tape 22 is adhered as braze coating 36 melts due to the localized and controlled heating action of infrared radiation beam 18, and subsequently cools as it is removed from the area of front 34 due to rotation of mandrel 12 in the direction shown by arrow 38 thereby building serial overlying layers of AMC joined to each other by alternating layers of braze material 36. Simultaneously with the creation of front 34 and the movement of prepeg tape 22 in the direction indicated by arrow 38, compaction wheel 28 pushes prepeg tape 22, and consequently associated melted braze coating 36, into intimate contact with surface 24 on mandrel 12 causing prepeg tape 22 to adhere firmly thereto. The specific conditions under which such fabrication can occur are described in greater detail hereinafter.

Consolidation apparatus 10 fundamentally comprises a 2-axis filament winder of the type used in the fabrication of polymer matrix composites. According to a preferred embodiment, mandrel 12 can be up to 48 inches long and up to about 36 inches in diameter. Of course, larger dimensioned devices can be used in those cases where larger structural members are being fabricated. The rotational movement of mandrel 12 and the linear traverse of compaction wheel 28 on carriage unit 26 are controlled and coordinated by means of "Pattern Master" software or the like that are supplied with the filament winder unit, or custom deigned and implemented if a specific non-standard wrap pattern is required or desired.

Laser 16 preferably comprises a stacked multi-bar infrared laser. An array of optical lenses 39 are used to shape infrared radiation beam 18 into a rectangular pattern that matches the cross-sectional dimension of prepeg tape 22. According to a preferred embodiment of the invention, laser 16 is powered by a DC power supply capable of delivering 75 amps to the preferred stacked multi-bar diode laser 16. Laser 16 in this configuration is designed to operate in a continuous wave mode at a power of up to 500 watts. Water cooling of the laser head is required to maintain the life of the diodes and is conventionally accomplished by means of a water-to-air chiller unit (not shown). Multi-bar diode lasers of this type are commercially available from Opto Power Corporation, 3321 E. Global Loop, Tucson, Ariz. 85706.

Mandrel 12 must, of course be collapsible or otherwise removable once the finished structure is completed by completion of the wrapping operation. Similarly, surface 24 of mandrel 12 should be of a material that will resist adhesion to melted and cooled braze coating 36 and simultaneously minimize conductive heat loss from the parts during fabrication to provide better and more accurate process control, although in the latter case, alternative process controls may be used to minimize the effects of the material on surface 24 on the brazing process. In one embodiment of the present invention, a suitable ceramic tube fabricated from shale and fire clay was cut into three segments and attached to a chuck arrangement to allow for expansion and contraction. In this case, the amount of material removed during the cutting operation was minimized to prevent surface 24 from being out of round.

As shown in FIG. 1, immediately after junction 20 prepeg tape 22 is contacted on its reverse side 40 by compacting wheel 28 to accomplish consolidation. As with surface 24 of mandrel 12, compacting wheel is preferably fabricated from a ceramic material to minimize conductive heat loss from junction 20 during consolidation. A highly preferred material for compaction wheel 28 is zirconium phosphate which exhibits these and other suitable properties. Of course, suitable alternative process controls can make the selection of materials for compaction wheel 28 less critical. Compaction wheel 28 is arranged to ride at top dead center of mandrel 12 and is guided in its movement by carriage assembly 26. Compaction wheel 28 in addition to providing compressive energy for consolidation also has a second important function, in that it provides a V-shaped cavity at junction 20 thereby reducing reflective losses by trapping some of the infrared radiation of beam 18 and creating a "multiple bounce" situation where most of the incoming radiation is used for heating and less of such radiation is lost due to reflection from the various surfaces at junction 20.

Preheat lamps 30, and where used post heat lamp(s) 32 preferably comprise reflector lamps as line sources of infrared energy to preheat or post heat prepeg tape 22 prior to or after exit from junction 20. Preheat lamps 30 preferably heat prepeg tape 22 to a temperature of about 500° F. in order to reduce the heating load on laser 16. As will be obvious to the skilled artisan, such preheating may not be required if a higher powered laser is used. Post heating lamp(s) 32 are similarly configured, and if and where applied can be used to control the cool down of prepeg tape 22 as it exits junction 20 to reduce the thermal stresses that may be induced by the brazing process.

According to an alternative preferred embodiment of the present invention, a rotary ball vibrator 42 that induces vibration in the range of from about 1000 to about 25000 vibrations per minute is added to consolidation apparatus 10 to provide a more thorough mixing of molten braze alloy front 34 at junction 20. Rotary ball vibrator 42 is attached to a metal rod 44 that contacts prepeg tape 22 just before it enters junction 20. The presence of rotary ball vibrator 42 causes prepeg tape 22 to vibrate at the same frequency as vibrator 42 which in turn induces oscillations in front 34 at junction 20. Thus, these oscillations occur in junction 20 as prepeg tape 22 is addressed by compaction wheel 28.

According to yet another alternative preferred embodiment of the present invention, a flow of inert gas is applied over the heated area at junction 20 to minimize the formation of oxides in front 34 during brazing. Free flowing argon, nitrogen or the like inert gas directed to the area of junction 20 appears to provide such benefit.

Optical pyrometer 33 may be included to provide temperature feedback formation to the control circuits of laser 16 thereby assuring that the appropriate mount of heat is being applied at junction 20 to achieve satisfactory melting of raze coating 36 and consolidation as described above.

Finally, at least in process development and refinement situations, it can be desirable to include a video camera (not shown) to closely monitor the area of junction 20 to obtain the appropriate operating parameters for a specific given prepeg tape 22 and braze coating 34 composition.

In practice, the method of the present invention is carried out using the above-described apparatus 10 by first wrapping an initial turn of a suitable prepeg tape of, for example, pure aluminum, 1100 alloy aluminum or any other suitable aluminum, titanium, magnesium etc. metallic matrix containing a ceramic reinforcing material, for example, Nextel 610™ aluminum oxide 1500 denier fibers commercially available from the 3M Corporation, Minneapolis, Minn. According to a specifically preferred embodiment of the present invention the prepeg tape, whatever its composition, is about 0.5 inches wide, 0.015 inches thick with a rectangular cross section about mandrel 12. Prepeg tape 22 is provided as a coil on a payoff for continuous feeding. Consolidation apparatus 10 is then activated. Mandrel 12 begins to turn, laser 16 is focused on junction 20 and prepeg 22 is fed into junction 20 for consolidation by compacting wheel 28. The specific process conditions are largely a matter of choice as dictated by the materials being consolidated (the AMC matrix alloy and the braze coating composition), the power of laser 16, the rotational speed of mandrel 12 etc. However, in the case of fabrication of the above-described prepeg tape bearing braze coatings of the types referred to in the examples below, melting temperatures in the range of from about 375 to about 1200° F. produced by a suitable laser operating at between about 100 and about 450 watts and prepeg tape feed rates on the order of between about 0.65 and 1.50 inches/sec. have been found useful and appropriate.

EXAMPLES

The following examples when considered in conjunction with the foregoing detailed description will serve to better illustrate the successful practice of the present invention.

Examples 1–4

Prepeg tapes comprising Nextel 610™ fibers in pure aluminum were consolidated as described hereinabove using the following braze coatings and under the following tabularly presented operating conditions:

| | Braze Coating | Braze Temperature | Laser Power | Tape Feed Rate |
|---|---|---|---|---|
| 1) | 96.5 Sn/3.5 Ag | 430–500° F. | 426 Watts | 0.70 inches/sec. |
| 2) | 70 Sn/30 Zn | 389–707° F. | 110 Watts | 1.06 inches/sec. |
| 3) | 84 Zn/11 Al/5 Cu | 715–845° F. | 268 Watts | 0.87 inches/sec. |
| 4) | 88 Al/12 Si | 1070–1220° F. | 373 Watts | 1.27 inches/sec. |

Under each of the foregoing conditions, satisfactory consolidated round structural shapes of the prepeg material indicated were fabricated.

As the invention has been described, it will be apparent to the skilled artisan that the same may be varied in many ways without departing from the spirit and scope of the invention. Any and all such modifications are intended to be included within the scope of the appended claims.

What is claimed is:

1. A method for the fabrication of structural members of metal matrix composites comprising:
A) providing a rotating mandrel having a surface addressed by a linearly traversing compaction wheel;
B) angularly feeding an metal matrix prepeg tape having a braze coating on at least one surface of said tape at the point of contact between said mandrel surface and said compaction wheel so as to define a V-shaped junction, said braze coating addressing said mandrel surface as said prepeg tape is angularly fed;
C) impacting said braze coating with a beam of infrared radiation at said junction to melt said braze coating in said junction; and
D) simultaneously with the impacting of said beam of infrared radiation in said junction, rotating said mandrel so as to take up said prepeg tape as said melted braze coating cools and solidifies and pressing said compaction roll against said prepeg tape so as to cause consolidation of said prepeg tape with previously applied layers of said prepeg tape on said mandrel surface.

2. The method of claim 1 wherein said prepeg tape comprises a matrix of aluminum or an alloy of aluminum encompassing ceramic fibers.

3. The method of claim 2 wherein said ceramic fibers comprise aluminum oxide.

4. The method of claim 1 wherein said infrared radiation is produced by a stacked multi-bar infrared laser.

5. The method of claim 4 wherein said stacked multi-bar infrared laser includes optical lenses that shape the infrared radiation into a pattern that matches the cross sectional dimensions of said prepeg tape.

6. The method of claim 1 wherein said mandrel is collapsible so as to permit removal of multiple layers of applied prepeg tape therefrom when fabrication is complete.

7. The method of claim 1 wherein said mandrel surface and said compaction wheel both comprise the same or different ceramic materials.

8. The method of claim 1 wherein said prepeg tape is preheated with infrared reflector lamps prior to entering said junction.

9. The method of claim 1 including the further step of providing an optical pyrometer that views said melted braze coating in said junction and provides temperature feedback information for controlling the power of said infrared radiation or the speed of rotation of said mandrel.

10. The method of claim 1 further including the application of vibratory energy to said prepeg tape prior to entry into said junction at a frequency of between about 1000 and 25000 vibrations per minute.

11. The method of claim 1 wherein said prepeg tape comprises a matrix of 1100 aluminum alloy or pure aluminum having aluminum oxide fibers embedded therein, said braze coating is selected from the group consisting of 96.5 Sn/3.5 Ag, 70 Sn/30 Zn, 84 Zn/11 Al/5 Cu and 88 Al/12 Si, the temperature of said braze coating in said junction ranges from about 375° F. to about 1200° F., said infrared radiation is provided by an infrared laser operating at a power level of from about 100 to about 450 watts and said prepeg tape is fed at a rate of between about 0.65 and about 1.5 inches/sec.

12. The method of claim 11 wherein said prepeg tape is about 0.5 inches wide and about 0.15 inches thick.

13. The method of claim 1 further including the introduction of an inert gas into said V-shaped junction.

14. An apparatus for the fabrication of structural members of metal matrix composites comprising:
A) a rotating mandrel having a peripheral surface;
B) a carriage mechanism;
C) a compaction wheel attached to said carriage mechanism so as to permit controlled lateral traverse of said compaction wheel across said peripheral surface;
D) a metal matrix composite prepeg tape feeding mechanism that supplies metal matrix tape having a braze coating applied thereto on the surface of said tape that addresses said peripheral surface to a junction between said peripheral surface and said compaction wheel, said junction defining a V-shape between said metal matrix tape and said peripheral surface as it enters said junction; and
E) a laser generating an infrared beam that impacts said braze coating in said junction causing it to fuse as said metal matrix tape passes under said compaction wheel.

15. The apparatus of claim 14 wherein said prepeg tape comprises a matrix of aluminum or an aluminum alloy encompassing ceramic fibers.

16. The apparatus of claim 15 said laser comprises a stacked multi-bar infrared laser.

17. The apparatus of claim 16 wherein said stacked multi-bar infrared laser includes optical lenses that shape the infrared beam into a pattern that matches the cross sectional dimensions of said prepeg tape.

18. The apparatus of claim 14 wherein said mandrel is collapsible so as to permit removal of multiple layers of applied prepeg tape therefrom when fabrication is complete.

19. The apparatus of claim 14 wherein said peripheral surface and said compaction wheel both comprise the same or different ceramic materials.

20. The apparatus of claim 14 further including preheaters that heat said prepeg tape prior to entering said junction.

21. The apparatus of claim 20 wherein said preheaters comprise infrared reflector lamps.

22. The apparatus of claim 14 further including an optical pyrometer that addresses said junction and views said braze coating in said junction and provides temperature feedback information for controlling the power of said laser or the rotation speed of said mandrel.

23. The apparatus of claim 14 further including a mechanism for inducing vibratory energy to said prepeg tape prior to entry into said junction at a frequency of between about 1000 and 25000 vibrations per minute.

* * * * *